United States Patent
Shiozawa et al.

(10) Patent No.: US 10,493,961 B2
(45) Date of Patent: Dec. 3, 2019

(54) BRAKING FORCE CONTROL METHOD AND BRAKING FORCE CONTROL DEVICE

(71) Applicant: Nissan Motor Co., Ltd., Yokohama-shi, Kanagawa (JP)

(72) Inventors: Yuuki Shiozawa, Kanagawa (JP); Ikuma Shindo, Kanagawa (JP); Naoki Miyashita, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/093,051

(22) PCT Filed: Apr. 15, 2016

(86) PCT No.: PCT/JP2016/062180
§ 371 (c)(1),
(2) Date: Oct. 11, 2018

(87) PCT Pub. No.: WO2017/179212
PCT Pub. Date: Oct. 19, 2017

(65) Prior Publication Data
US 2019/0135244 A1    May 9, 2019

(51) Int. Cl.
*B60T 7/12* (2006.01)
*B60T 8/32* (2006.01)

(52) U.S. Cl.
CPC . *B60T 7/12* (2013.01); *B60T 8/32* (2013.01)

(58) Field of Classification Search
None
See application file for complete search history.

(56) References Cited

U.S. PATENT DOCUMENTS

2010/0228460 A1* 9/2010 Saito .................. B60T 7/12
701/70

FOREIGN PATENT DOCUMENTS

| JP | H07215185 A | 8/1995 |
|---|---|---|
| JP | 2006327369 A | 12/2006 |
| JP | 2015193278 A | 11/2015 |

* cited by examiner

*Primary Examiner* — Tamara L Weber
(74) *Attorney, Agent, or Firm* — Young Basile Hanlon & MacFarlane, P.C.

(57) ABSTRACT

A braking force control method detects a wheel speed of a vehicle, generates a holding braking force for holding the stopped state of the vehicle, regardless of whether or not a brake is operated by a driver of the vehicle, when it is determined that the vehicle has stopped, based on the wheel speed detected in the state in which a braking force is applied to the vehicle, and delays the period in which the holding braking force is generated, in accordance with the friction coefficient of a road surface in the traveling path of the vehicle.

8 Claims, 9 Drawing Sheets

BRAKING FORCE CONTROL METHOD AND BRAKING FORCE CONTROL DEVICE

TECHNICAL FIELD

The present invention relates to a braking force control method and a braking force controller.

BACKGROUND

Japanese Patent Application Publication No. H7-215185 A discloses a technology for, when the wheel speed has been zero for a predetermined time in the state in which a braking force is applied to a vehicle, determining that the vehicle is at rest and holding the braking force even when a driver lifts his or her foot from a brake pedal.

However, when it is determined whether or not the vehicle has stopped, based on the wheel speed, the braking force may be held with the wheel speed kept at zero before the vehicle sufficiently decelerates on a low-friction road surface. This may make it difficult to control the vehicle behavior until the vehicle stops.

It is an object of the present invention to prevent a braking force for holding the stopped state of a vehicle from being held before the vehicle sufficiently decelerates on a low-friction road surface.

SUMMARY

According to an aspect of the present invention, there is provided a A braking force control method including: applying a braking force to a vehicle upon operation of a brake pedal; applying a braking force to the vehicle, regardless of whether or not the brake pedal is operated, after elapse of a predetermined time after determining that the vehicle has stopped based on a wheel speed; and setting the predetermined time longer when a friction of a surface of a road on which the vehicle travels is low than when the friction of the surface of the road is high.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION

Embodiments of the present invention will be described below with reference to the drawings.

First Embodiment (Configuration)

Figure 1:
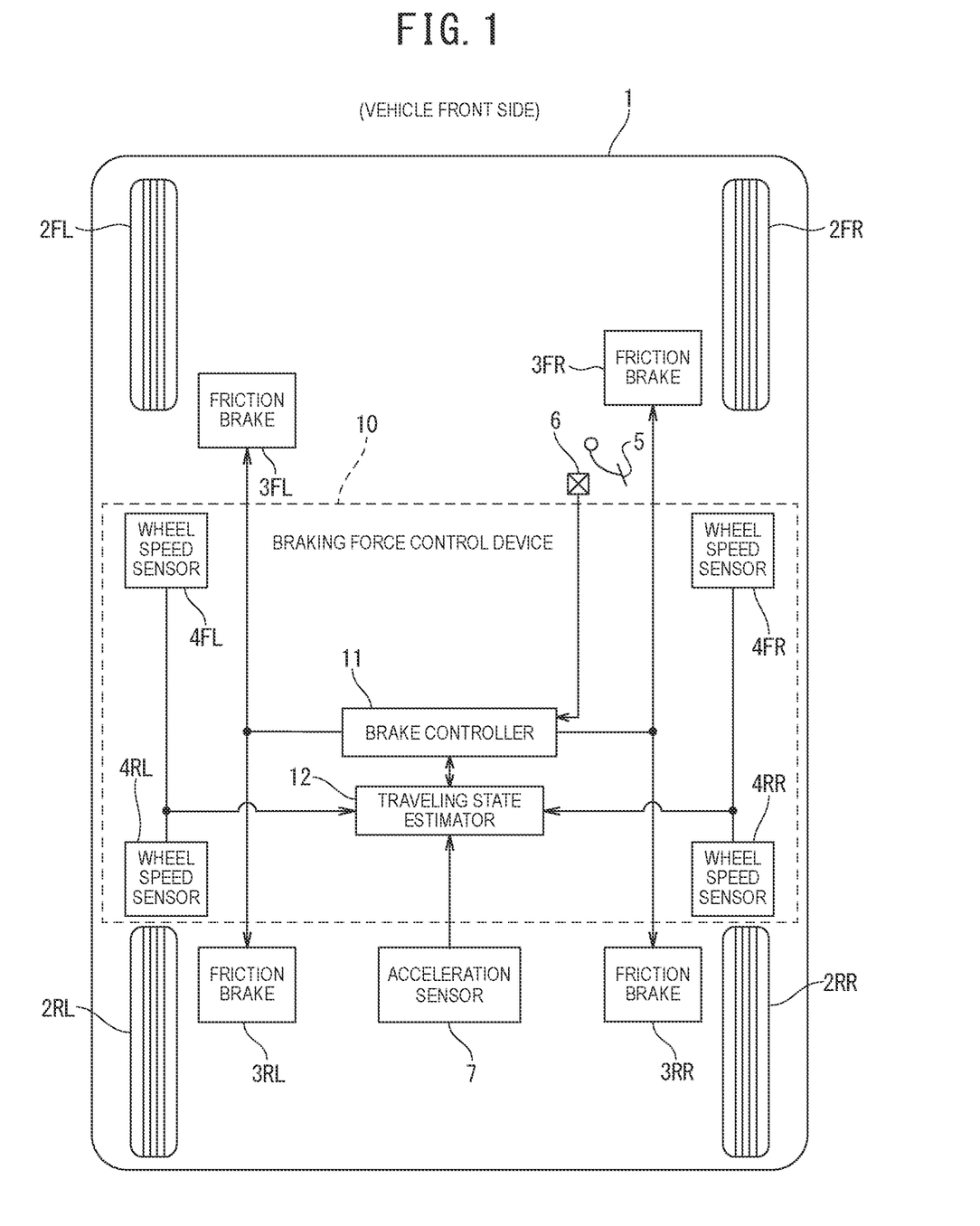
FIG. 1 is a block diagram illustrating an example of a configuration of a vehicle including a braking force controller according to a first embodiment.

FIG. 1 will be referred to herein. A braking force controller according to a first embodiment is placed in, for example, a vehicle 1. Reference numerals 2FR, 2FL, 2RR, and 2RL denote a right front wheel, a left front wheel, a right rear wheel, and a left rear wheel, respectively, of the vehicle 1. Reference numerals 3FR, 3FL, 3RR, and 3RL denote friction brakes which apply frictional braking forces to the right front wheel 2FR, the left front wheel 2FL, the right rear wheel 2RR, and the left rear wheel 2RL, respectively. Reference numerals 4FR, 4FL, 4RR, and 4RL denote wheel speed sensors which detect the speeds of the right front wheel 2FR, the left front wheel 2FL, the right rear wheel 2RR, and the left rear wheel 2RL, respectively.

Reference numeral 5 denotes a brake pedal for allowing a driver to operate a brake which applies a braking force to the vehicle 1. Reference numeral 6 denotes a brake pedal sensor which detects the amount of operation (amount of treading operation) of the brake pedal 5 by the driver of the vehicle 1. Reference numeral 7 denotes an acceleration sensor which detects a forward and backward acceleration Gx of the vehicle 1.

The right front wheel 2FR, the left front wheel 2FL, the right rear wheel 2RR, and the left rear wheel 2RL will sometimes be collectively referred to as "wheels 2" or a "wheel 2" hereinafter. The friction brakes 3FR, 3FL, 3RR, and 3RL will sometimes be collectively referred to as "friction brakes 3" or a "friction brake 3" hereinafter. The wheel speed sensors 4FR, 4FL, 4RR, and 4RL will sometimes be collectively referred to as "wheel speed sensors 4" or a "wheel speed sensor 4" hereinafter.

A braking force controller 10 includes wheel speed sensors 4, a brake controller 11, and a traveling state estimator 12.

The brake controller 11 and the traveling state estimator 12 are examples of a controller described in the claims. Each of the brake controller 11 and the traveling state estimator 12 is implemented as an electronic control unit including a CPU (Central Processing Unit) and a CPU peripheral component such as a ROM (Read Only Memory) and a RAM (Random Access Memory). The CPU of the electronic control unit executes processing to be performed by the brake controller 11 and the traveling state estimator 12, by executing a computer program stored on a storage medium. The brake controller 11 and the traveling state estimator 12 may be implemented as separate electronic control units or as a single electronic control unit.

The traveling state estimator 12 receives a signal detected by the wheel speed sensor 4 and determines whether or not the vehicle 1 has stopped, based on a speed w of the wheel 2 indicated by the signal detected by the wheel speed sensor 4. For example, the traveling state estimator 12 may determine that the vehicle 1 has stopped when the wheel speed w falls below a predetermined value. For example, the traveling state estimator 12 may determine that the vehicle 1 has stopped when the wheel speed w has become zero.

In a low-speed region where the vehicle 1 has a speed lower than a first speed threshold Vt1 (for example, 2 to 3 km/h), it may be difficult for the wheel speed sensor 4 to detect a vehicle speed V. Therefore, the traveling state estimator 12 may wait until it is determined whether or not the speed w of the wheel 2 has been zero for a predetermined judgement time Td. In other words, the traveling state estimator 12 may determine that the vehicle 1 has stopped when the speed w of the wheel 2 has been zero for the predetermined judgement time Td.

The traveling state estimator 12 outputs a stop judgement result indicating that it is determined that the vehicle 1 has stopped to the brake controller 11.

The brake controller 11 determines whether or not the vehicle 1 is in a state in which a braking force is applied thereto. When the stop judgement result is received from the traveling state estimator 12 in the state in which a braking force is applied to the vehicle 1, the brake controller 11 generates by the friction brake 3, a braking force for holding the stopped state of the vehicle 1 regardless of whether or not the brake pedal 5 is operated by the driver.

For example, the brake controller 11 reads a detection signal of the amount of operation of the brake pedal 5 output from the brake pedal sensor 6. When the amount of operation of the brake pedal 5 is larger than a predetermined amount, the brake controller 11 determines that the vehicle 1 is in the state in which a braking force is applied thereto by a driver brake operation. When the stop judgement result is received in the state in which a braking force is applied to the vehicle 1 by the driver brake operation, the brake controller 11 generates by the friction brake 3, a braking force for holding the stopped state of the vehicle 1 regardless of whether or not the brake pedal 5 is operated.

A braking force for holding the stopped state of the vehicle 1, regardless of whether or not the brake pedal 5 is operated by the driver, applied when the stop judgement result is received from the traveling state estimator 12 in the state in which a braking force is applied to the vehicle 1 will be referred to as a "holding braking force" hereinafter.

When the friction coefficient of a road surface in the traveling path of the vehicle 1 is low, even if the vehicle speed V is higher than a low-speed region less than the above-mentioned first speed threshold Vt1, the wheel speed w may apparently become zero upon locking of the wheel 2. In this case, it takes a long time to actually stop the vehicle 1.

The traveling state estimator 12 therefore prevents a holding braking force from being applied before the vehicle speed V sufficiently lowers by delaying the period in which the brake controller 11 generates the holding braking force, in accordance with the friction coefficient of the road surface.

For example, the traveling state estimator 12 may delay the period in which the holding braking force is generated by delaying the period in which the stop judgement result is output to the brake controller 11, in accordance with the friction coefficient of the road surface. For example, the traveling state estimator 12 may delay the period in which the holding braking force is generated by setting long the judgement time Td, the judgement time Td being the duration until it is determined that the vehicle 1 has stopped after the wheel speed w becomes zero. The judgement time Td is an example of a predetermined time described in the claims.

In this manner, delaying the period in which a holding braking force is generated, in accordance with the friction coefficient of the road surface, can prevent the holding braking force from being held before the vehicle speed V sufficiently lowers (for example, before the stop of the vehicle) on the road surface, which may have a low friction coefficient. For example, delaying the period in which a holding braking force is generated, to grant the driver a grace period for releasing a lock of the wheel 2, can prevent the holding braking force from hindering a lock release operation by the driver.

Figure 2:
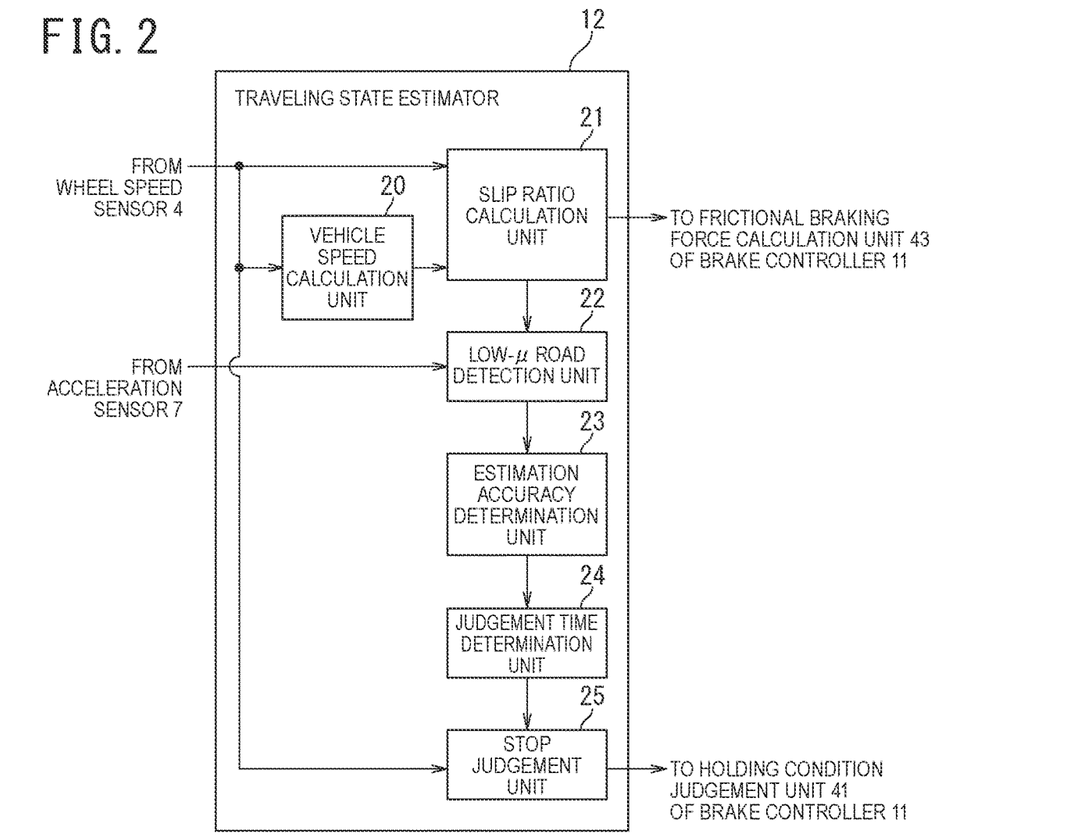
FIG. 2 is a block diagram illustrating an example of a functional configuration of a traveling state estimator according to the first embodiment.

FIG. 2 will be referred to herein. The traveling state estimator 12 includes a vehicle speed calculation unit 20, a slip ratio calculation unit 21, a low-µ road detection unit 22, an estimation accuracy determination unit 23, a judgement time determination unit 24, and a stop judgement unit 25.

The vehicle speed calculation unit 20 calculates a speed V of the vehicle 1, based on a wheel speed w indicated by a signal detected by the wheel speed sensor 4. The vehicle speed calculation unit 20 outputs information concerning the calculated vehicle speed V to the slip ratio calculation unit 21.

The slip ratio calculation unit 21 calculates a slip ratio ((V−w)/V), based on the speed V of the vehicle 1 and the wheel speed w of the wheel 2.

The slip ratio calculation unit 21 may calculate a slip ratio in a region higher in speed than a low-speed region less than the first speed threshold Vt1 where it is hard to detect an actual vehicle speed V from a signal detected by the wheel speed sensor 4. For example, the slip ratio calculation unit 21 may calculate a slip ratio S in a speed region less than a second speed threshold Vt2 (for example, 10 km/h) higher than the first speed threshold Vt1. The vehicle speed calculation unit 20 may acquire a vehicle speed V using, for example, the GPS (Global Positioning System) or an optical ground speed meter to prevent any influence that a slip of the wheel 2 on a road surface having a low friction coefficient exerts on calculation of a vehicle speed V.

The slip ratio calculation unit 21 outputs the calculated slip ratio S to the low-µ road detection unit 22.

The low-µ road detection unit 22 receives the slip ratio S from the slip ratio calculation unit 21. The low-µ road detection unit 22 further receives the forward and backward acceleration Gx of the vehicle 1 from the acceleration sensor 7. The low-µ road detection unit 22 estimates whether or not the friction coefficient of a road surface in the traveling path of the vehicle 1 is lower than a predetermined friction coefficient threshold, based on the slip ratio S and the acceleration Gx. A road having a surface exhibiting a friction coefficient lower than the friction coefficient threshold will sometimes be referred to as a "low-µ road" hereinafter.

Figure 3:
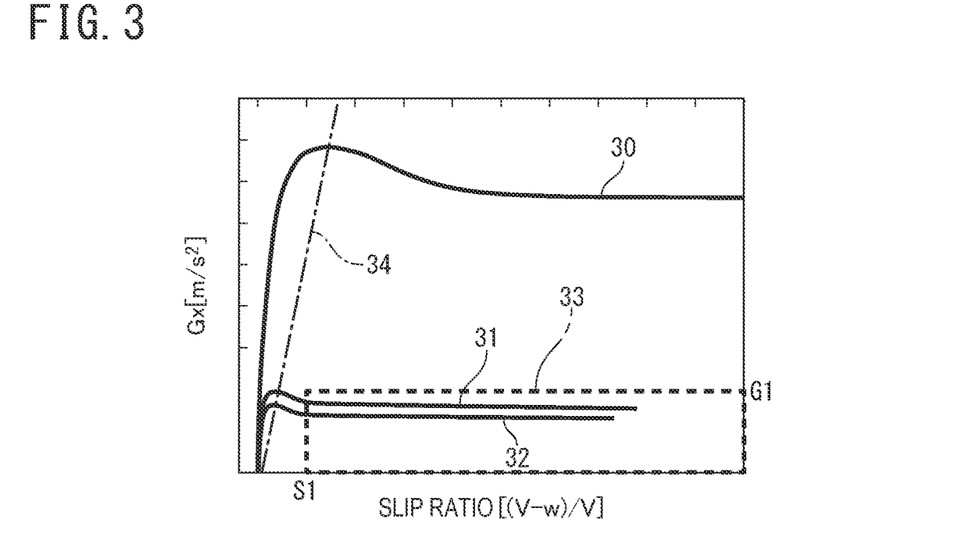
FIG. 3 is a graph for explaining an example of a method for judging a low-μ road.

FIG. 3 will be referred to herein. Solid lines 30, 31, and 32 indicate tire characteristic curves representing the relationships between the slip ratio S and the forward and backward acceleration Gx on respective road surfaces having different friction coefficients. For example, the solid line 30 indicates a characteristic curve for a wet road surface, the solid line 31 indicates a characteristic curve for a basalt road surface, and the solid line 32 indicates a characteristic curve for a tile road surface.

For example, the low-µ road detection unit 22 estimates that the traveling path of the vehicle 1 is on a low-µ road when a combination of the calculated value of the slip ratio S and the detected value of the acceleration Gx falls within a low-μ judgement region 33 bounded by a dotted line.

For example, the low-μ judgement region 33 may be set within a range represented by an inequality Gx<α×S assuming that a straight line 34 connecting the peaks of a plurality of different characteristic curves 30, 31, and 32 is given by Gx=α×S. The coefficient α represents the slope of the straight line 34. In other words, the low-μ judgement region 33 may be set within a range having an acceleration Gx lower than the product of the slip ratio S and the slope a in a tire characteristic diagram representing the relationship between the slip ratio S and the forward and backward acceleration Gx.

Setting the low-μ judgement region 33 in this way can prevent a road having a surface exhibiting a relatively high friction coefficient from being erroneously estimated as a low-μ road.

An upper limit G1 of the acceleration Gx in the low-μ judgement region 33 may be set as a maximum value that the characteristic curve of a road surface having a friction coefficient threshold set as the friction coefficient of a road surface to be judged as a low-μ road can take within a range represented by an inequality Gx<α×S. A lower limit S1 of the slip ratio S in the low-μ judgement region 33 may be set to (G1/α) or more.

The low-μ road detection unit 22 may obtain a braking force F generated on the wheel 2 in place of the forward and backward acceleration Gx. For example, the low-μ road detection unit 22 may receive information concerning a braking force F generated on the wheel 2 from the brake controller 11 that controls a target braking force generated on the wheel 2.

The low-μ road detection unit 22 may estimate whether or not the traveling path of the vehicle 1 is on a low-μ road, based on the slip ratio S and the braking force F.

A tire characteristic curve representing the relationship between the slip ratio S and the braking force F exhibits a characteristic similar to that of a tire characteristic curve representing the relationship between the slip ratio S and the forward and backward acceleration Gx. The low-μ road detection unit 22 may estimate whether or not the traveling path of the vehicle 1 is on a low-μ road, using the braking force F as in the acceleration Gx. The low-μ road detection unit 22 outputs the estimation result of a low-μ road to the estimation accuracy determination unit 23.

The estimation accuracy determination unit 23 determines the accuracy of estimation of a friction coefficient by the low-μ road detection unit 22, that is, the accuracy of estimation that the traveling path of the vehicle 1 is on a low-μ road.

For example, the estimation accuracy determination unit 23 determines the accuracy of estimation of a friction coefficient in accordance with the number of times the low-μ road detection unit 22 has repeatedly determined that the traveling path of the vehicle 1 is on a low-μ road within the period in which the vehicle speed V is lower than the second speed threshold Vt2. For example, the estimation accuracy determination unit 23 may determine a higher accuracy for a larger number of times it has been determined that the traveling path of the vehicle 1 is on a low-μ road. For example, the estimation accuracy determination unit 23 may determine an accuracy proportional to the number of times it has been determined that the traveling path of the vehicle 1 is on a low-μ road.

When the low-μ road detection unit 22 judges a low-μ road at a predetermined judgement cycle T, the estimation accuracy determination unit 23 may determine the accuracy of estimation of a friction coefficient in accordance with a cumulative time defined as the product of the number of times it has been determined that the traveling path of the vehicle 1 is on a low-μ road and the judgement cycle T. The estimation accuracy determination unit 23 may determine a higher accuracy for a longer cumulative time, for example, may determine an accuracy proportional to the cumulative time.

The estimation accuracy determination unit 23 outputs the determined accuracy to the judgement time determination unit 24.

The judgement time determination unit 24 determines the judgement time Td in accordance with the accuracy received from the estimation accuracy determination unit 23. This is done because it is difficult to ensure a given accuracy of judgement of a low-μ road due to the influence of vehicle body vibration or the like. In view of this, the judgement time determination unit 24 determines the judgement time Td in accordance with the accuracy of estimation of a friction coefficient by the low-μ road detection unit 22 to prevent unnecessary prolongation of the judgement time Td by an estimation result with a low accuracy.

For example, when no low-μ road is detected by the low-μ road detection unit 22 and the output value from the estimation accuracy determination unit 23 is "0", the judgement time determination unit 24 may set the judgement time Td to a predetermined value T0, and may set the judgement time Td longer as the output value (that is, accuracy) from the estimation accuracy determination unit 23 is larger.

For example, the judgement time determination unit 24 may set the judgement time Td such that the judgement time Td is proportional to the output value (i.e. the accuracy of estimation of the friction coefficient) from the estimation accuracy determination unit 23 and the judgement time Td takes the predetermined value T0 when the output value output from the estimation accuracy determination unit 23 is "0".

In addition, for example, when no low-μ road is detected by the low-μ road detection unit 22 and the output value from the estimation accuracy determination unit 23 is equal to or smaller than a predetermined threshold, the judgement time determination unit 24 may set the judgement time Td to the predetermined value T0, and when no low-μ road is detected by the low-μ road detection unit 22 and the output value from the estimation accuracy determination unit 23 is larger than the predetermined threshold, the judgement time determination unit 24 may set the judgement time Td larger than the predetermined value T0.

The judgement time determination unit 24 may set the judgement time Td to the predetermined value T0 when no low-μ road is detected, and may determine the judgement time Td in accordance with the accuracy of estimation of a friction coefficient when a low-μ road is detected. In other words, the judgement time determination unit 24 determines the judgement time Td in accordance with the friction coefficient of a road surface and the accuracy of estimation of this friction coefficient and delays the period in which the brake controller 11 generates the holding braking force. The predetermined value T0 may be, for example, 0.5 sec.

An upper limit may be set for the judgement time Td. The upper limit of the judgement time Td may be set to, for example, a time (for example, 2.0 sec) sufficient for a driver skilled in releasing a locked state by himself or herself to become aware of tire locking and unlock the brake pedal 5. Alternatively, the judgement time Td may be set longer to avoid relying on the driver's skill.

The judgement time determination unit 24 outputs the determined judgement time Td to the stop judgement unit 25.

The stop judgement unit 25 determines that the vehicle 1 has stopped when the wheel speed w has been zero for the slip judgement time Td. In other words, it is determined that the vehicle 1 has stopped when the stop duration in which a state where the wheel speed w has been zero continues is longer than the judgement time Td.

The stop judgement unit 25 outputs the stop judgement result indicating that it is determined that the vehicle 1 has stopped to the brake controller 11.

Figure 4:
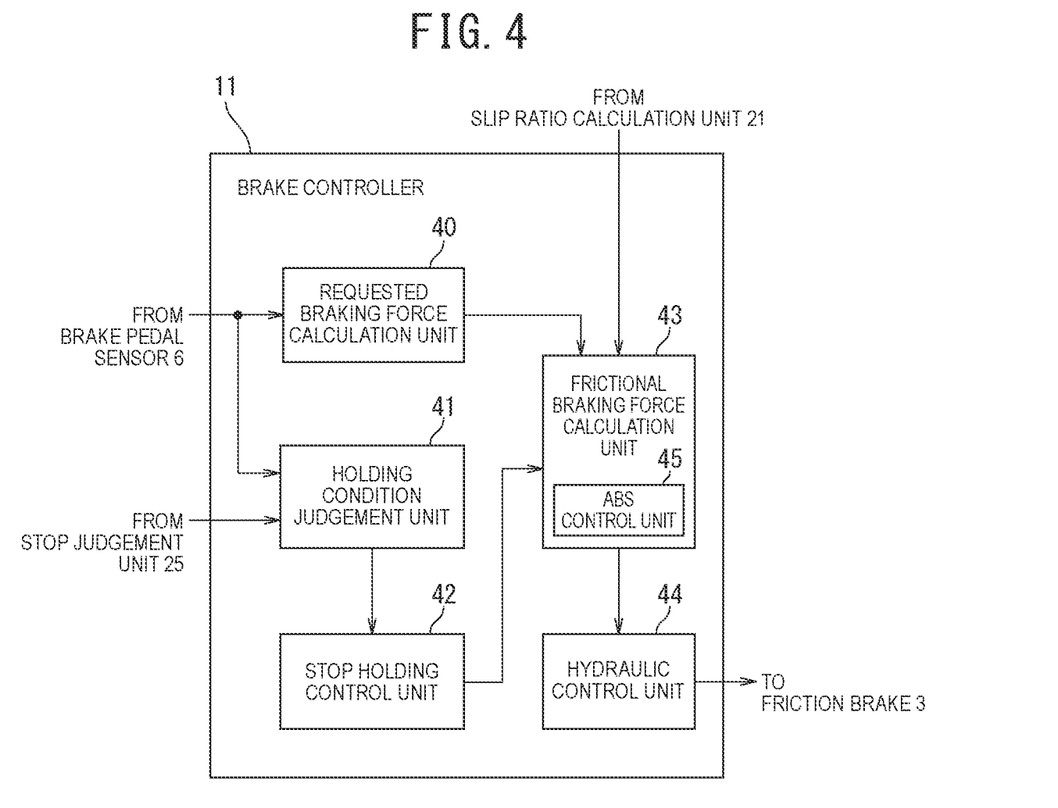
FIG. 4 is a block diagram illustrating an example of a functional configuration of a brake controller according to the first embodiment.

FIG. 4 will be referred to herein. The brake controller 11 includes a requested braking force calculation unit 40, a holding condition judgement unit 41, a stop holding control unit 42, a frictional braking force calculation unit 43, and a hydraulic control unit 44.

The requested braking force calculation unit 40 reads a detection signal of the amount of operation of the brake pedal 5 output from the brake pedal sensor 6. The requested braking force calculation unit 40 calculates a requested braking force as a requested value for the braking force according to the amount of operation of the brake pedal 5. The requested braking force calculation unit 40 outputs information concerning the requested braking force to the frictional braking force calculation unit 43.

The holding condition judgement unit 41 reads a detection signal of the amount of operation of the brake pedal 5 output from the brake pedal sensor 6. The holding condition judgement unit 41 receives from the stop judgement unit 25, the stop judgement result indicating that it is determined that the vehicle 1 has stopped.

The holding condition judgement unit 41 determines whether or not the holding braking force is to be generated by the friction brake 3 regardless of whether or not the brake pedal 5 is operated by the driver, in accordance with the amount of operation of the brake pedal 5 and the stop judgement result.

For example, the holding condition judgement unit 41 determines that the holding braking force is to be generated by the friction brake 3 when the following conditions A1 and A2 are satisfied:

(A1) The vehicle 1 is in a state in which a braking force is applied thereto. For example, when the amount of operation of the brake pedal 5 is larger than a predetermined amount, the holding condition judgement unit 41 determines that the vehicle 1 is in the state in which the braking force is applied thereto by a driver brake operation.

(A2) The stop judgement result indicating that it is determined that the vehicle 1 has stopped is received from the stop judgement unit 25.

When it is determined that the holding braking force is to be generated by the friction brake 3, the holding condition judgement unit 41 outputs a stop holding instruction for generating the holding braking force by the friction brake 3 to the stop holding control unit 42.

Upon receiving the stop holding instruction, the stop holding control unit 42 outputs information concerning the holding braking force to the frictional braking force calculation unit 43.

The frictional braking force calculation unit 43 calculates a frictional braking force to be generated by the friction brake 3, in accordance with the braking force designated from the requested braking force calculation unit 40 or the frictional braking force calculation unit 43.

The frictional braking force calculation unit 43 may include an ABS (Antilock Brake System) control unit 45 which releases a lock of the wheel 2 occurring by a frictional braking force applied to the wheel 2. For example, the ABS control unit 45 reduces a braking force generated by the friction brake 3 based on an instruction from the requested braking force calculation unit 40, in accordance with the slip ratio S received from the slip ratio calculation unit 21.

The hydraulic control unit 44 applies a frictional braking force to the wheel 2 by controlling the hydraulic pressure of the friction brake 3 in accordance with the braking force calculated by the frictional braking force calculation unit 43.

(Operation)

Figure 5:
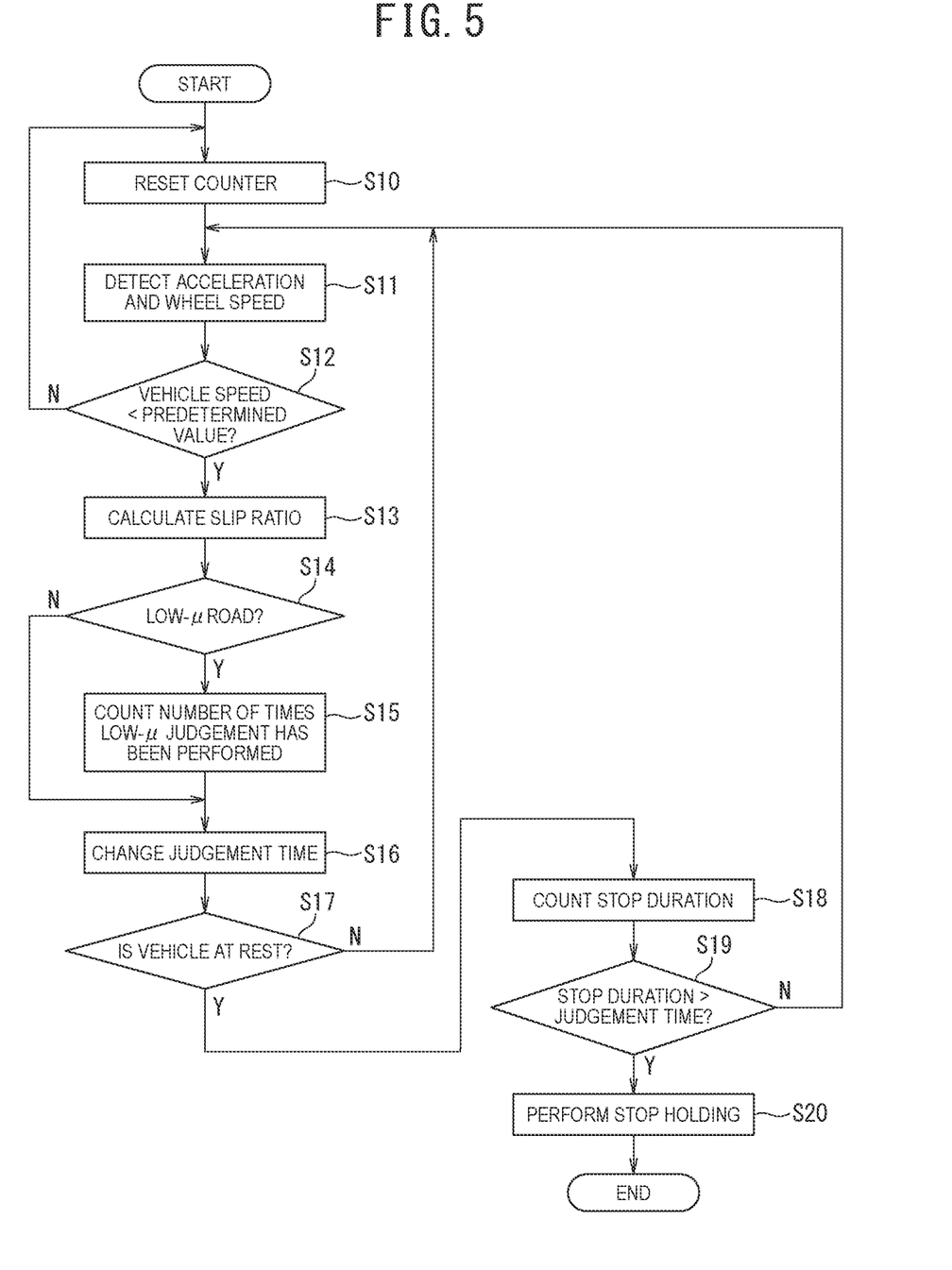
FIG. 5 is a flowchart illustrating an example of a braking force control method according to the first embodiment.

The operation of the braking force controller 10 according to the first embodiment will be described. FIG. 5 will be referred to herein.

In step S10, the estimation accuracy determination unit 23 resets to "0," a counter for counting the number of times it has been determined that the traveling path of the vehicle 1 is on a low-µ road. The stop judgement unit 25 further resets to "0," a timer counter for counting the stop duration defined as the duration in which a state where the wheel speed w has been zero (that is, a state where it is determined that the vehicle 1 is at rest) continues.

In step S11, the acceleration sensor 7 detects a forward and backward acceleration Gx of the vehicle 1. The wheel speed sensor 4 detects the speed of the wheel 2.

In step S12, the vehicle speed calculation unit 20 calculates a speed V of the vehicle 1. The traveling state estimator 12 determines whether or not the vehicle speed V is lower than a predetermined second speed threshold Vt2. If the vehicle speed V is lower than the predetermined second speed threshold Vt2 (step S12: Y), the process advances to step S13. If the vehicle speed V is equal to or higher than the predetermined second speed threshold Vt2 (step S12: N), the process returns to step S10.

In step S13, the slip ratio calculation unit 21 calculates a slip ratio S.

In step S14, the low-µ road detection unit 22 determines whether or not the traveling path of the vehicle 1 is on a low-µ road. If the traveling path of the vehicle 1 is on a low-µ road (step S14: Y), the process advances to step S15. If the traveling path of the vehicle 1 is not on a low-µ road (step S14: N), the process advances to step S16.

In step S15, the estimation accuracy determination unit 23 increments by one the value of a counter for counting the number of times it has been determined that the traveling path of the vehicle 1 is on a low-µ road.

In step S16, the judgement time determination unit 24 changes the judgement time Td in accordance with the number of times it has been determined that the traveling path of the vehicle 1 is on a low-µ road.

In step S17, the stop judgement unit 25 determines whether or not the vehicle 1 is at rest in accordance with whether or not the wheel speed w is zero. If the vehicle 1 is at rest (step S17: Y), the process advances to step S18. If the vehicle 1 is not at rest (step S17: N), the process returns to step S11.

In step S18, the stop judgement unit 25 counts the stop duration. For example, the value of a timer counter for counting the stop duration is incremented to increase the stop duration by a length corresponding to the low-µ road judgement cycle T.

In step S19, the stop judgement unit 25 determines whether or not the stop duration is longer than the judgement time Td. If the stop duration is longer than the judgement time Td (step S19: Y), the process advances to step S20. If the stop duration is not longer than the judgement time Td (step S19: N), the process returns to step S11.

In step S12 to be executed subsequently, when the vehicle speed V rises and becomes equal to or higher than the second speed threshold Vt2 (No in step S12), the friction coefficient of a road surface is expected to have changed due to a change in traveling state of the vehicle 1. Therefore, the process returns to step S10, in which the counters for counting the number of times low-μ road judgement has been performed and the stop duration are reset to "0".

In step S20, the holding condition judgement unit 41 outputs the stop holding instruction for generating a holding braking force even after the stop of the vehicle 1. A braking force generated by the friction brake 3 at the stop of the vehicle 1 is held or increased in accordance with the stop holding instruction to hold the stopped state of this vehicle. The process then ends.

(Advantageous Effects of First Embodiment)

(1) The brake controller 11 applies a braking force to the vehicle 1 upon the operation of the brake pedal 5 by the driver, determines whether or not the vehicle 1 has stopped, based on the wheel speed, applies a braking force to the vehicle 1, regardless of whether or not the brake pedal 5 is operated, after elapse of a predetermined time after it is determined that this vehicle has stopped, and sets the predetermined time longer when the friction of the surface of a road on which the vehicle 1 travels is low than when the friction of the surface of the road is high.

This can prevent the holding braking force from being held before the vehicle speed V sufficiently lowers on a low-friction road surface.

Hence, for example, delaying the period in which a holding braking force is generated, to grant the driver a grace period for releasing a lock of the wheel 2, can prevent the holding braking force from hindering a lock release operation by the driver.

In addition, for example, on a road surface having a low friction coefficient, generation of the holding braking force can be delayed after it is determined that the vehicle 1 has stopped, based on the wheel speed w, until the expected point of time when the vehicle 1 actually stops.

Furthermore, for example, the holding braking force can be prevented from hindering the operation of the ABS control unit 45.

(2) The judgement time determination unit 24 sets the judgement time Td used to determine whether or not the vehicle has stopped, based on the wheel speed, longer when the friction of the surface of a road on which the vehicle 1 travels is low than when the friction of the surface of the road is high. This allows determination as to whether or not the vehicle 1 has stopped by taking the judgement time Td longer when the traveling path of the vehicle 1 is on a low-μ road than when this traveling path is not on a low-μ road. This improves the accuracy of stop judgement of the vehicle 1.

(3) The low-μ road detection unit 22 estimates whether or not the friction of the road surface is lower than a first predetermined threshold. The estimation accuracy determination unit 23 determines whether or not the accuracy of estimation of the friction of the road surface is higher than a second predetermined threshold. The judgement time determination unit 24 sets the judgement time Td longer when the friction of the road surface is lower than the first predetermined threshold and the accuracy is higher than the second predetermined threshold than when the friction of the road surface is lower than the first predetermined threshold and the accuracy is lower than the second predetermined threshold. This can prevent unnecessary prolongation of the judgement time Td when the accuracy of estimation of the friction of the road surface is low.

(4) The vehicle speed calculation unit 20 calculates the speed of the vehicle 1, based on the wheel speed w. The estimation accuracy determination unit 23 determines that the accuracy of the friction of the road surface is higher when the cumulative time in which the low-μ road detection unit 22 has repeatedly determined that the friction of the traveling path of the vehicle 1 is lower than the first predetermined threshold within the period in which the vehicle speed V is lower than the second speed threshold Vt2 is long than when this cumulative time is short. Alternatively, the estimation accuracy determination unit 23 determines that the accuracy of the friction is higher when the number of times the low-μ road detection unit 22 has repeatedly determined that the friction of the traveling path of the vehicle 1 is lower than the first predetermined threshold within the period in which the vehicle speed V is lower than the second speed threshold Vt2 is large than when this number of times is small. Therefore, with a configuration which estimates whether or not the traveling path of the vehicle 1 is on a low-μ road, the accuracy of estimation of a low-μ road can be determined.

Second Embodiment (Configuration)

A second embodiment will be described below. A traveling state estimator 12 according to the second embodiment does not estimate whether or not the traveling path of a vehicle 1 is on a low-μ road, but instead estimates the value of the friction coefficient of the traveling path of the vehicle 1, that is, a maximum braking acceleration which can be generated on a road surface in this path. The traveling state estimator 12 determines the judgement time Td which gradually changes in response to a change in value of the friction coefficient.

Figure 6:
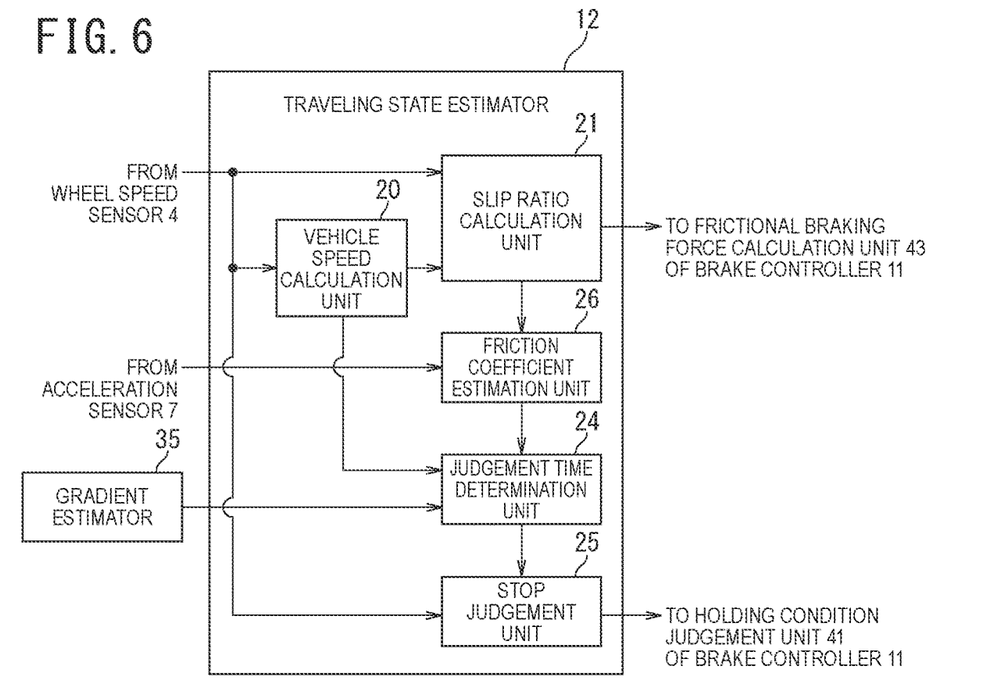
FIG. 6 is a block diagram illustrating an example of a functional configuration of a traveling state estimator according to a second embodiment.

FIG. 6 will be referred to herein. The same reference numerals as in the traveling state estimator 12 according to the first embodiment denote the same components constituting the traveling state estimator 12 according to the second embodiment. The traveling state estimator 12 includes a friction coefficient estimation unit 26 which estimates the friction coefficient of the traveling path of the vehicle 1.

The friction coefficient estimation unit 26 may estimate the friction coefficient of the traveling path of the vehicle 1 using, for example, the following method.

Figure 7:
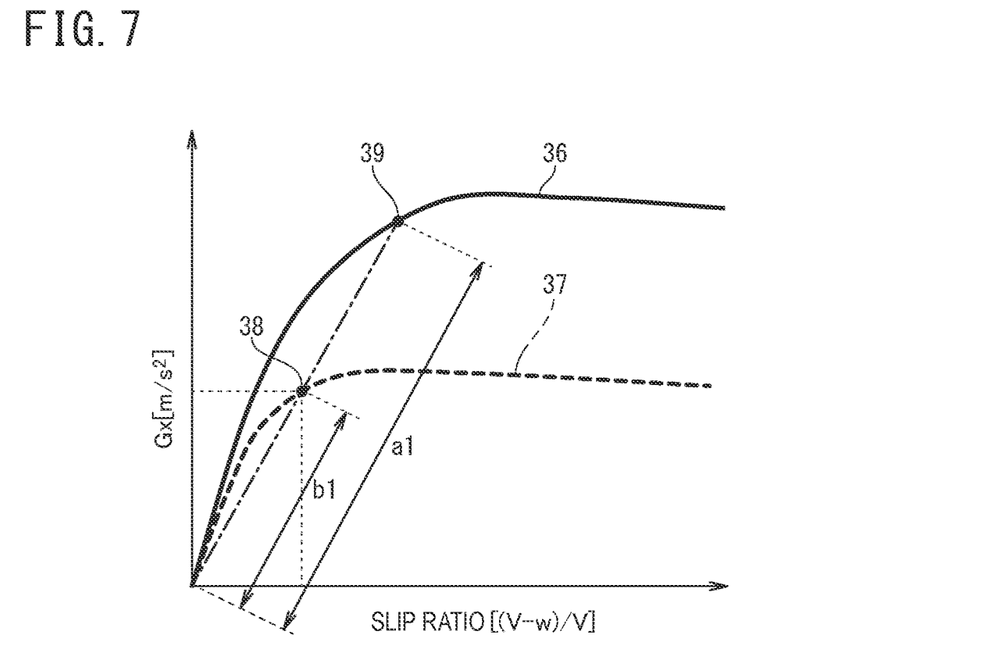
FIG. 7 is a graph for explaining an example of a method for estimating a friction coefficient.

FIG. 7 will be referred to herein. A solid line 36 indicates a tire characteristic curve for the vehicle 1 representing the relationship between a slip ratio S on a reference road surface having a known friction coefficient μ1 and a forward and backward acceleration Gx.

Assuming that the tire characteristic curve of the vehicle 1 on a road surface in the traveling path of the vehicle 1 is the one indicated by a broken line 37, the friction coefficient of the road surface in the traveling path of the vehicle 1 is represented by μ2 for the sake of convenience. A point 38 indicates a measurement point representing the slip ratio S calculated by the slip ratio calculation unit 21 and the forward and backward acceleration Gx detected by the acceleration sensor 7.

In characteristic curves for road surfaces having the different friction coefficients μ1 and μ2, lengths a1 and b1 of straight lines obtained by connecting points 39 and 38, respectively, equal in ratio (Gx/S) between the acceleration Gx and the slip ratio S to an origin having zero acceleration Gx and zero slip ratio S are calculated herein. In this case, the ratio (a1/b1) between the lengths a1 and b1 is known to be equal to that ($\mu1/\mu2$) between the friction coefficients $\mu1$ and $\mu2$.

The friction coefficient estimation unit 26 therefore calculates the ratio (Gx/S) of the forward and backward acceleration Gx detected by the acceleration sensor 7 to the slip ratio S calculated by the slip ratio calculation unit 21.

The friction coefficient estimation unit 26 calculates a first point 39 which allows the ratio of the forward and backward acceleration to the slip ratio to be equal to the calculated ratio Gx/S in the characteristic curve 36 on the reference road surface.

The friction coefficient estimation unit 26 calculates the first distance a1 between the origin and the first point 39.

The friction coefficient estimation unit 26 further calculates the second distance b1 between the origin and the measurement point 38.

The friction coefficient estimation unit 26 calculates the product ($\mu1 \times b1$)/(a1) of the ratio (b1/a1) of the second distance b1 to the first distance a1 multiplied by the friction coefficient $\mu1$ of the reference road surface, as the friction coefficient $\mu2$ of the road surface in the traveling path of the vehicle 1.

The friction coefficient estimation unit 26 may estimate the friction coefficient $\mu2$ using a tire characteristic curve representing the relationship between the slip ratio S and a braking force F generated on a wheel 2, in place of the tire characteristic curve representing the relationship between the slip ratio S and the forward and backward acceleration Gx.

The friction coefficient estimation unit 26 calculates the ratio (F/S) of the braking force F on the wheel 2 designated by the brake controller 11 to the slip ratio S calculated by the slip ratio calculation unit 21.

The friction coefficient estimation unit 26 calculates a first point which allows the ratio of the braking force generated on the wheel 2 to the slip ratio to be equal to the calculated ratio (F/S) in the characteristic curve on the reference road surface. The friction coefficient estimation unit 26 calculates a first distance between an origin having zero braking force F and zero slip ratio S and the first point.

The friction coefficient estimation unit 26 further calculates a second distance between a second point representing the braking force F on the wheel 2 designated by the brake controller 11 and the slip ratio S and the origin.

The friction coefficient estimation unit 26 calculates the product (($\mu1 \times$Second Distance)/First Distance) of the ratio (Second Distance/First Distance) of the second distance to the first distance multiplied by the friction coefficient $\mu1$ of the reference road surface, as the friction coefficient $\mu2$ of the road surface in the traveling path of the vehicle 1.

FIG. 6 will be referred to herein. The friction coefficient estimation unit 26 outputs the estimated friction coefficient $\mu2$ to the judgement time determination unit 24.

The judgement time determination unit 24 determines the judgement time Td which gradually changes in response to a change in the friction coefficient $\mu2$ received from the friction coefficient estimation unit 26. For example, the judgement time determination unit 24 calculates a braking time Tb taken for the vehicle 1 having its wheel 2 locked to stop on a road surface having the friction coefficient $\mu2$. In other words, the judgement time determination unit 24 calculates the braking time Tb taken to stop when a maximum braking force is generated on a road surface having the friction coefficient $\mu2$.

In this case, the judgement time determination unit 24 estimates a vehicle speed V from a wheel speed w detected immediately before steeply becoming zero upon a driver brake operation. The judgement time determination unit 24 calculates the braking time Tb taken to stop from the vehicle speed V when a maximum braking force is generated on a road surface having the friction coefficient $\mu2$. For example, the judgement time determination unit 24 calculates as the braking time Tb, a value obtained by dividing the vehicle speed V by a braking acceleration according to the friction coefficient $\mu2$. Therefore, the braking time Tb is proportional to the friction coefficient $\mu2$.

Assuming, for example, that the vehicle speed V immediately before the wheel speed w steeply becomes zero is 5 m/s and the friction coefficient $\mu2$ of the road surface is 0.2, the vehicle 1 can decelerate at about 2 m/s$^2$ and therefore stops within 5 sec at the latest. In view of this, the judgement time determination unit 24 sets the judgement time Td to the calculated braking time Tb or more as the time to delay the period in which the holding braking force is generated from the point of time when the wheel speed reaches a predetermined value (for example, zero).

Setting the judgement time Td to the braking time Tb or more in this way can more reliably prevent the holding braking force from being applied before the actual stop of the vehicle 1.

In addition, for example, the judgement time determination unit 24 may set the upper limit of the judgement time Td to the braking time Tb. Since the vehicle 1 is always expected to stop within the braking time Tb, setting the upper limit of the judgement time Td to the braking time Tb can prevent unnecessary prolongation of the judgement time Td which delays generation of the holding braking force.

The judgement time determination unit 24 may receive information concerning the gradient of the traveling path of the vehicle 1 from the gradient estimator 35 and calculate a more precise braking time Tb in accordance with the gradient of this traveling path. However, the second embodiment is not limited to a configuration which calculates the braking time Tb in accordance with the gradient of the traveling path, and the gradient estimator 35 may be omitted.

(Operation)

Figure 8:
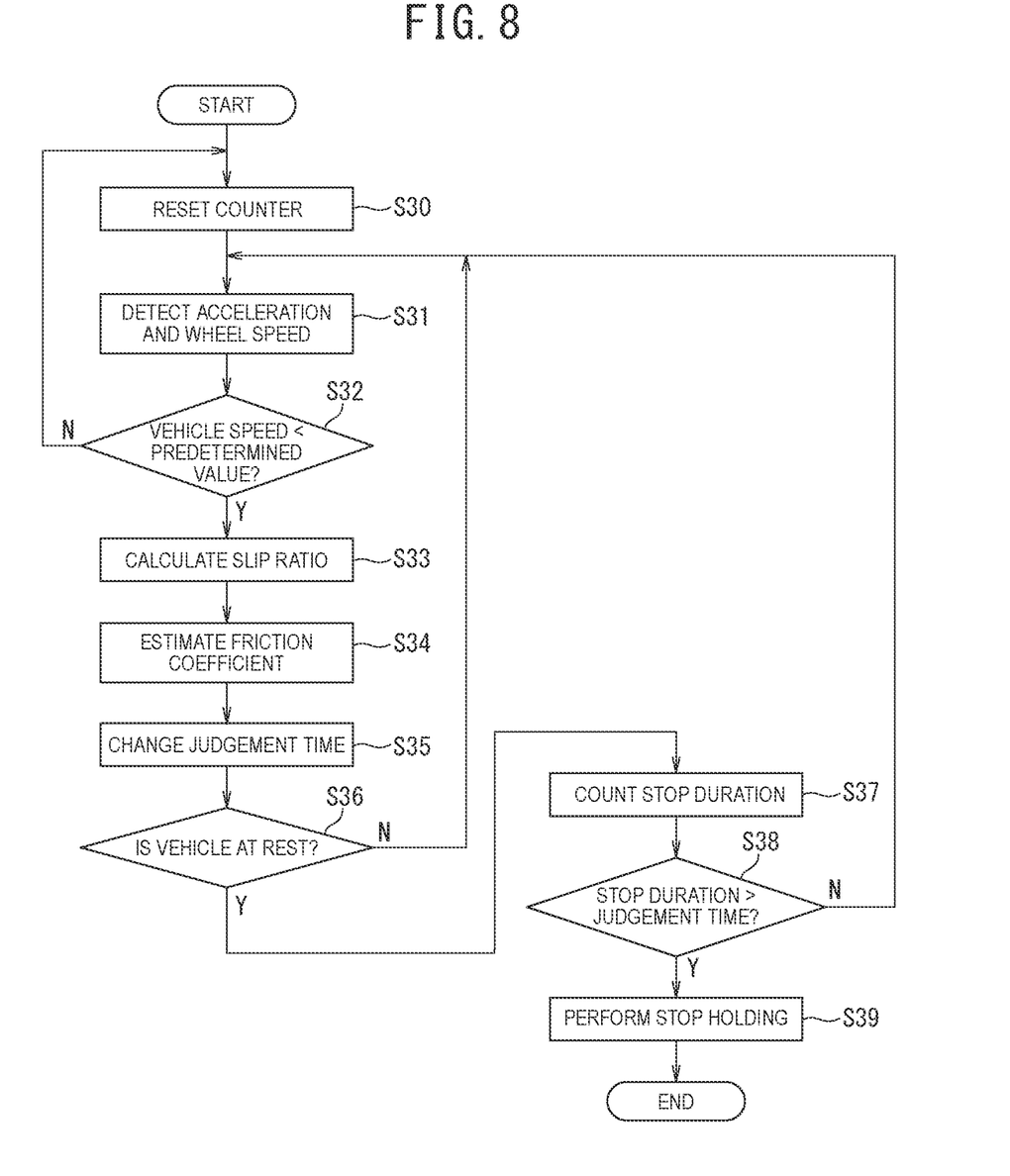
FIG. 8 is a flowchart illustrating an example of a braking force control method according to the second embodiment.

The operation of the braking force controller 10 according to the second embodiment will be described below. FIG. 8 will be referred to herein.

In step S30, the stop judgement unit 25 resets a timer counter for counting the stop duration to "0".

The processes in steps S31 to S33 are the same as those in steps S11 to S13 described with reference to FIG. 5.

In step S34, the friction coefficient estimation unit 26 estimates the friction coefficient $\mu2$ of the traveling path of the vehicle 1.

In step S35, the judgement time determination unit 24 determines the judgement time Td which gradually changes in response to a change in the friction coefficient $\mu2$ received from the friction coefficient estimation unit 26. For example, the judgement time determination unit 24 determines as the judgement time Td, a time longer than that taken for the vehicle 1 having its wheel 2 locked to stop on a road surface having the friction coefficient $\mu2$. The process then advances to step S36.

The processes in steps S36 to S39 are the same as those in steps S17 to S20 described with reference to FIG. 5.

(Advantageous Effects of Second Embodiment)

(1) The friction coefficient estimation unit 26 estimates the magnitude of the friction of the traveling path of the vehicle 1. The judgement time determination unit 24 sets as the judgement time Td, a time equal to or longer than the braking time Tb taken for the vehicle 1 having its wheel 2 locked to stop on a road surface exhibiting a friction having the magnitude estimated by the friction coefficient estimation unit 26.

Setting the judgement time Td to the braking time Tb or more can more reliably prevent the holding braking force from being applied before the actual stop of the vehicle 1.

(2) The judgement time determination unit 24 sets the upper limit of the judgement time Td to the braking time Tb. Since the vehicle 1 is always expected to stop within the braking time Tb, setting the upper limit of the judgement time Td to the braking time Tb can prevent unnecessary prolongation of the judgement time Td which delays generation of the holding braking force.

Third Embodiment

A third embodiment will be described below. A braking force controller 10 according to the third embodiment is mounted in a vehicle 1 including a motor serving as a power source and a driven wheel which is not driven by the motor.

The vehicle 1 including a motor as a power source can be braked by a regenerative braking force generated by the motor. The driven wheel is not locked when the vehicle 1 is braked only by a regenerative braking force generated by the motor. Therefore, even when the vehicle 1 is braked on a low-μ road, it is not determined that this vehicle has stopped at a vehicle speed V higher than a low-speed region less than the above-mentioned first speed threshold Vt1.

The braking force controller 10 according to the third embodiment therefore does not change the period in which the holding braking force is generated, in accordance with the friction coefficient of a road surface, when the vehicle 1 is braked only by a regenerative braking force generated by the motor. This can prevent unnecessary delay of generation of the holding braking force.

When the vehicle 1 is braked by a braking force including a frictional braking force generated by a friction brake 3, all wheels 2 may be locked. Therefore, when the vehicle 1 is braked by a braking force including a frictional braking force generated by the friction brake 3, the braking force controller 10 changes the period in which the holding braking force is generated, in accordance with the friction coefficient of the road surface. For example, the braking force controller 10 changes the period in which a holding braking force is generated, in accordance with the friction coefficient of the road surface, when the vehicle 1 is braked by a braking force including a frictional braking force upon the operation of a brake pedal 5 by a driver.

(Configuration)

Figure 9:
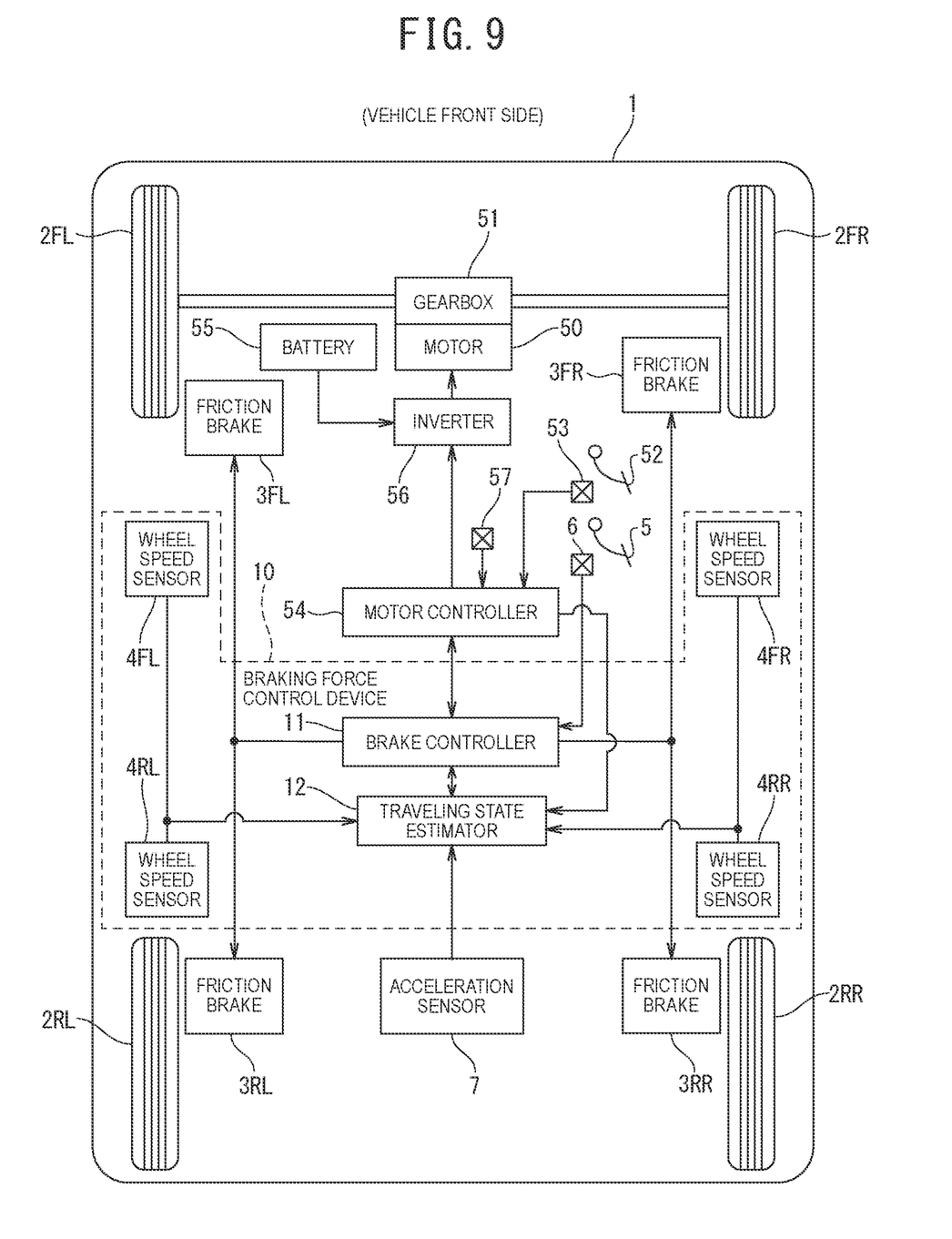
FIG. 9 is a block diagram illustrating an example of a configuration of a vehicle including a braking force controller according to a third embodiment.

FIG. 9 will be referred to herein. The same reference numerals as in the vehicle 1 (see FIG. 1) equipped with the braking force controller 10 according to the first embodiment denote the same components constituting the vehicle 1 equipped with the braking force controller 10 according to the third embodiment.

Reference numeral 50 denotes a motor 50 serving as a power source. The motor 50 drives a right front wheel 2FR and a left front wheel 2FL. A right rear wheel 2RR and a left rear wheel 2RL serve as driven wheels.

Reference numeral 51 denotes a gearbox which transmits the driving force of the motor 50 to the driving wheels 2FR and 2FL. Reference numeral 52 denotes an accelerator pedal. Reference numeral 53 denotes an accelerator pedal sensor which detects the amount of operation (amount of treading operation) of the accelerator pedal 52 by the driver.

Reference numeral 54 denotes a motor controller which controls the driving force and the regenerative braking force applied to the vehicle 1 by the motor 50. The motor controller 54 is implemented as, for example, an electronic control unit including a CPU and a CPU peripheral component such as a ROM and a RAM. The CPU of the electronic control unit executes processing to be performed by the motor controller 54 and a traveling state estimator 12, by executing a computer program stored on a storage medium.

Reference numeral 55 denotes a battery which supplies electric power to the motor 50 and stores electric power regenerated by the motor 50. Reference numeral 56 denotes an inverter which performs conversion control of the electric power of the battery 55 and supplies this electric power to the motor 50, and further performs conversion control of the regenerative power of the motor 50 and supplies this power to the battery 55.

The vehicle 1 includes a "one-pedal mode" and a "two-pedal mode" as modes for controlling the braking force and the driving force.

The one-pedal mode means a mode for controlling the driving force and the braking force for the vehicle 1 mainly in accordance with the operation of the accelerator pedal 52. In the one-pedal mode, a braking force which increases with a decrease in amount of operation of the accelerator pedal 52 is generated when the amount of operation of the accelerator pedal 52 is equal to or smaller than a predetermined operation amount threshold. The operation amount threshold may be set to an amount of operation (degree of opening) of, for example, about 25%.

The holding braking force is generated when the vehicle 1 stops in the state in which a braking force is applied to the vehicle 1 and the accelerator pedal 52 is not operated.

However, even in the one-pedal mode, the braking force for the vehicle 1 can be controlled in accordance with the operation of the brake pedal 5. The holding braking force is generated when the vehicle 1 stops in the state in which a braking force is applied to the vehicle 1 in accordance with the operation of the brake pedal 5.

When the amount of operation of the accelerator pedal 52 is larger than the operation amount threshold, a driving force which increases with an increase in amount of operation of the accelerator pedal 52 is generated.

The two-pedal mode means a mode for controlling the driving force of the vehicle 1 in accordance with the operation of the accelerator pedal 52 and controlling the braking force for the vehicle 1 mainly in accordance with the operation of the brake pedal 5. In the two-pedal mode, a greater driving force is generated with increased amount of operation of the accelerator pedal 52. A greater braking force is also generated with increased amount of operation of the brake pedal 5.

The vehicle 1 includes a mode selection switch 57 for selecting one of the "one-pedal mode" and the "two-pedal mode" as modes for controlling the braking force and the driving force.

The following description assumes that the "one-pedal mode" is selected by the mode selection switch 57.

Figure 10:
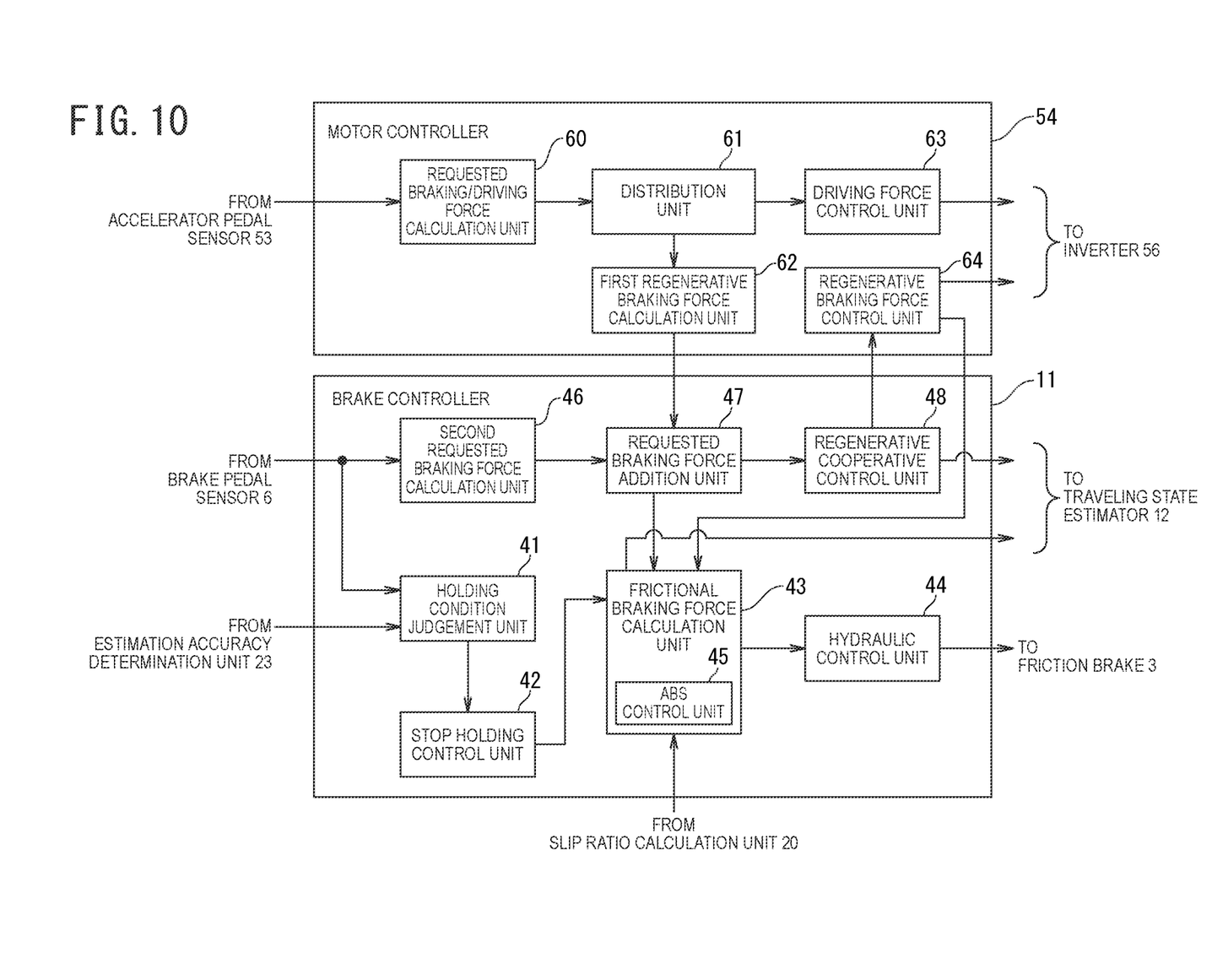
FIG. 10 is a block diagram illustrating an example of a functional configuration of a brake controller and a motor controller according to the third embodiment.

FIG. 10 will be referred to herein. The same reference numerals as in the brake controller 11 according to the first embodiment denote the same components constituting a brake controller 11 according to the third embodiment.

The brake controller 11 includes a second requested braking force calculation unit 46, a requested braking force addition unit 47, and a regenerative cooperative control unit 48.

The motor controller 54 includes a requested braking/driving force calculation unit 60, a distribution unit 61, a first regenerative braking force calculation unit 62, a driving force control unit 63, and a regenerative braking force control unit 64.

The requested braking/driving force calculation unit 60 reads a detection signal of the amount of operation of the accelerator pedal 52 output from the accelerator pedal sensor 53, as an amount of braking/driving force operation requested by the driver. The requested braking/driving force calculation unit 60 calculates a requested driving force to be generated on the vehicle 1 when the amount of operation of the accelerator pedal 52 is larger than an operation amount threshold. The requested braking/driving force calculation unit 60 further calculates a first requested braking force to be generated on the vehicle 1 when the amount of operation of the accelerator pedal 52 is equal to or smaller than the operation amount threshold. The requested braking/driving force calculation unit 60 outputs pieces of information concerning the calculated requested driving force and first requested braking force to the distribution unit 61.

The distribution unit 61 outputs the information concerning the requested driving force to the driving force control unit 63 and the information concerning the first requested braking force to the first regenerative braking force calculation unit 62.

The driving force control unit 63 calculates a driving current command value indicating a driving current for the motor 50 in accordance with the requested driving force. The driving force control unit 63 outputs the driving current command value to the inverter 56.

The first regenerative braking force calculation unit 62 calculates a first regenerative braking force to be generated on the motor 50 in accordance with the first requested braking force. The first regenerative braking force calculation unit 62 outputs the first regenerative braking force to the requested braking force addition unit 47.

The second requested braking force calculation unit 46 reads a detection signal of the amount of operation of the brake pedal 5 output from a brake pedal sensor 6. The second requested braking force calculation unit 46 calculates a second requested braking force in accordance with the amount of operation of the brake pedal 5. The second requested braking force includes at least one of a frictional braking force generated by the friction brake 3 and a regenerative braking force generated by the motor 50. The second requested braking force calculation unit 46 outputs information concerning the second requested braking force to the requested braking force addition unit 47.

The requested braking force addition unit 47 calculates a summed braking force by summing the first regenerative braking force and the second requested braking force. The requested braking force addition unit 47 outputs the summed braking force to the frictional braking force calculation unit 43. The requested braking force addition unit 47 further outputs pieces of information concerning the first regenerative braking force and the second regenerative braking force to the regenerative cooperative control unit 48.

The regenerative cooperative control unit 48 selects the greater one of the first regenerative braking force and the second regenerative braking force as a requested regenerative braking force and outputs information concerning the requested regenerative braking force to the regenerative braking force control unit 64. The regenerative cooperative control unit 48 further outputs the information concerning the requested regenerative braking force to the judgement time determination unit 24 of the traveling state estimator 12.

The regenerative braking force control unit 64 calculates an amount of regeneration according to the requested regenerative braking force. The amount of regeneration is a regenerative braking force to be generated on the motor 50. The regenerative braking force control unit 64 calculates a current command value for generating on the motor 50, a regenerative torque according to the calculated amount of regeneration. The regenerative braking force control unit 64 outputs information concerning the calculated current command value to the inverter 56, which generates a regenerative torque on the motor 50, based on this current command value.

The regenerative braking force control unit 64 further outputs the information concerning the calculated current command value to the frictional braking force calculation unit 43.

The frictional braking force calculation unit 43 calculates a frictional braking force to be actually generated by the friction brake 3, by subtracting the amount of regeneration calculated by the regenerative braking force control unit 64 from the summed braking force calculated by the requested braking force addition unit 47. The frictional braking force calculation unit 43 outputs information concerning the calculated frictional braking force to the hydraulic control unit 44 and the judgement time determination unit 24 of the traveling state estimator 12.

The hydraulic control unit 44 generates a frictional braking force on the wheel 2 by controlling the hydraulic pressure of the friction brake 3 in accordance with the braking force calculated by the frictional braking force calculation unit 43.

The judgement time determination unit 24 of the traveling state estimator 12 receives the current command value for generating a regenerative torque on the motor 50 from the regenerative braking force control unit 64. The judgement time determination unit 24 further receives the information concerning the frictional braking force from the frictional braking force calculation unit 43.

The judgement time determination unit 24 determines whether or not the vehicle 1 is braked only by the regenerative braking force of the motor 50, based on the current command value and the frictional braking force.

When the vehicle 1 is braked only by a regenerative braking force, the judgement time determination unit 24 does not change the period in which the holding braking force is generated, in accordance with the friction coefficient of a road surface. For example, the judgement time determination unit 24 does not delay the period in which the holding braking force is generated, in accordance with the result of determining whether or not the traveling path of the vehicle 1 is on a low-μ road. For example, the judgement time determination unit 24 does not delay the period in which the holding braking force is generated, even when the low-μ road detection unit 22 determines that the traveling path of the vehicle 1 is on a low-μ road. For example, the judgement time determination unit 24 does not change the judgement time Td from a predetermined value T0 when the vehicle 1 is braked only by a regenerative braking force.

When the vehicle 1 is braked by a braking force including a frictional braking force, for example, when the vehicle 1 is braked by a braking force including a frictional braking force generated upon the operation of the brake pedal 5 by the driver, the judgement time determination unit 24 changes the period in which the holding braking force is generated, in accordance with the friction coefficient of the road surface. For example, the judgement time determination unit 24 changes the judgement time Td in accordance with the friction coefficient of the road surface. The period in which the holding braking force is generated is determined by the judgement time determination unit 24 using the same method as described in the first embodiment.

In the third embodiment, like the second embodiment, the friction coefficient of the road surface in the traveling path of the vehicle 1 may be estimated, and delay of the period in which the holding braking force is generated may be gradually changed in accordance with a change in value of the friction coefficient.

(Operation)

Figure 11:
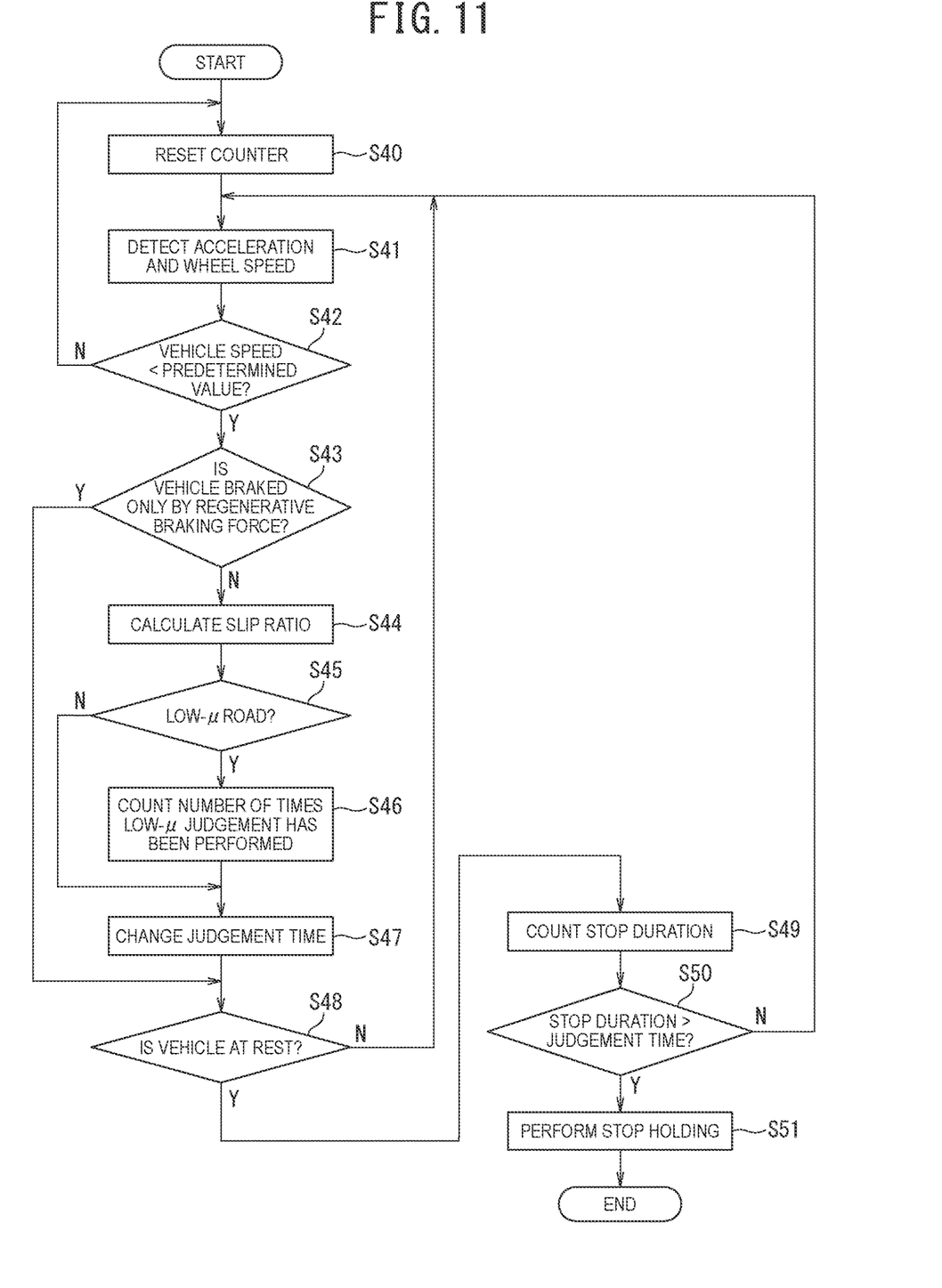
FIG. 11 is a flowchart illustrating an example of a braking force control method according to the third embodiment.

The operation of the braking force controller 10 according to the third embodiment will be described next. FIG. 11 will be referred to herein.

The processes in steps S40 to S42 are the same as those in steps S10 to S12 described with reference to FIG. 5.

In step S43, the judgement time determination unit 24 determines whether or not the vehicle 1 is braked only by the regenerative braking force of the motor 50. If the vehicle 1 is braked only by the regenerative braking force (step S43: Y), the process skips steps S44 to S47 and advances to step S48. In other words, the judgement time determination unit 24 does not execute step S47, in which the judgement time Td is changed.

If the vehicle 1 is braked by a braking force including a frictional braking force (step S43: N), the process advances to step S44. As a result, the judgement time determination unit 24 changes the judgement time Td in accordance with the friction coefficient of the road surface in steps S44 to S47. The process then advances to step S48.

The processes in steps S48 to S51 are the same as those in steps S17 to S20 described with reference to FIG. 5.

(Advantageous Effects of Third Embodiment)

The vehicle 1 includes the motor 50 serving as a power source, the driving wheels 2FR and 2FL, and the driven wheels 2RR and 2RL. The judgement time determination unit 24 determines whether or not the vehicle 1 is braked only by a regenerative braking force generated by the motor 50 of the regenerative braking force and a frictional braking force generated by the friction brake 3. When it is determined that the vehicle 1 is braked only by a regenerative braking force, the judgement time determination unit 24 does not change the period in which the holding braking force is generated, in accordance with the friction coefficient of the road surface. Therefore, the stop holding control unit 42 applies a braking force to the vehicle 1, regardless of whether or not the brake pedal is operated, after elapse of the judgement time Td set irrespective of the magnitude of the friction of the road surface.

When it is determined that the vehicle 1 is braked by a braking force including a frictional braking force generated upon the operation of the brake pedal 5 by the driver, the judgement time determination unit 24 sets the judgement time Td longer when the friction of the road surface is low than when the friction of the road surface is high.

The driven wheels 2RR and 2RL are not locked when the vehicle 1 is braked only by a regenerative braking force. This means that it is not determined that the vehicle has stopped before the vehicle speed V sufficiently lowers even on a low-µ road. Therefore, not changing the period in which the holding braking force is generated, in accordance with the friction coefficient of the road surface when the vehicle 1 is braked only by a regenerative braking force, can prevent unnecessary delay of generation of the holding braking force.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 . . . vehicle
2 . . . wheel
2FL . . . left front wheel
2FR . . . right front wheel
2RL . . . left rear wheel
2RR . . . right rear wheel
3FL, 3FR, 3RL, 3RR . . . friction brake
4FL, 4FR, 4RL, 4RR . . . wheel speed sensor
5 . . . brake pedal
6 . . . brake pedal sensor
7 . . . acceleration sensor
10 . . . braking force controller
11 . . . brake controller
12 . . . traveling state estimator
20 . . . vehicle speed calculation unit
21 . . . slip ratio calculation unit
22 . . . low-µ road detection unit
23 . . . estimation accuracy determination unit
24 . . . judgement time determination unit
25 . . . stop judgement unit
26 . . . friction coefficient estimation unit
35 . . . gradient estimator
40 . . . requested braking force calculation unit
41 . . . holding condition judgement unit
42 . . . stop holding control unit
43 . . . frictional braking force calculation unit
44 . . . hydraulic control unit
45 . . . ABS control unit
46 . . . second requested braking force calculation unit
47 . . . requested braking force addition unit
48 . . . regenerative cooperative control unit
50 . . . motor
52 . . . accelerator pedal
53 . . . accelerator pedal sensor
54 . . . motor controller
55 . . . battery
56 . . . inverter
57 . . . mode selection switch
60 . . . requested braking/driving force calculation unit
61 . . . distribution unit
62 . . . first regenerative braking force calculation unit
63 . . . driving force control unit
64 . . . regenerative braking force control unit

The invention claimed is:

1. A braking force control method comprising:
   detecting a wheel speed of a vehicle by a wheel speed sensor;
   applying a braking force to the vehicle upon operation of a brake pedal by a driver;

determining whether or not the vehicle has stopped, based on the wheel speed;

applying a braking force to the vehicle, regardless of whether or not the brake pedal is operated, after elapse of a predetermined time after determining that the vehicle has stopped; and setting the predetermined time longer when a friction of a surface of a road on which the vehicle travels is low than when the friction of the surface of the road is high.

2. The braking force control method according to claim 1, wherein the predetermined time is a judgement time used to determine whether or not the vehicle has stopped, based on the wheel speed.

3. The braking force control method according to claim 1, further comprising:

determining whether or not the friction of the surface of the road is lower than a first predetermined threshold;

determining whether or not an accuracy of estimation of the friction of the surface of the road is higher than a second predetermined threshold; and setting the predetermined time longer when the friction of the surface of the road is lower than the first predetermined threshold and the accuracy is higher than the second predetermined threshold than when the friction of the surface of the road is lower than the first predetermined threshold and the accuracy is not more than the second predetermined threshold.

4. The braking force control method according to claim 3, further comprising:

calculating a speed of the vehicle, based on the wheel speed; and determining that the accuracy is higher when a cumulative time in which it has been repeatedly determined that the friction of the surface of the road is lower than the first predetermined threshold within a period in which the speed of the vehicle is lower than a predetermined value is long than when the cumulative time is short.

5. The braking force control method according to claim 1, further comprising:

estimating a magnitude of the friction of the surface of the road; and setting as the predetermined time, a time not less than a braking time taken for the vehicle having a wheel locked to stop on the surface of the road exhibiting the friction having the estimated magnitude.

6. The braking force control method according to claim 5, wherein the braking time is an upper limit of the predetermined time.

7. The braking force control method according to claim 1, further comprising:

determining whether or not the vehicle comprising a driving wheel driven by a motor and a driven wheel which is not driven by the motor is braked only by a regenerative braking force of the regenerative braking force generated by the motor and a frictional braking force generated upon the operation of the brake pedal;

when it is determined that the vehicle is braked only by the regenerative braking force, applying a braking force to the vehicle, regardless of whether or not the brake pedal is operated, after elapse of the predetermined time set irrespective of a magnitude of the friction of the surface of the road; and when it is determined that the vehicle is braked by a braking force including the frictional braking force generated upon the operation of the brake pedal by the driver, setting the predetermined time longer when the friction of the surface of the road is low than when the friction of the surface of the road is high.

8. A braking force control device comprising:

a wheel speed sensor configured to detect a wheel speed of a vehicle; and a controller configured to apply a braking force to the vehicle upon operation of a brake pedal to be operated by a driver, apply a braking force to the vehicle, regardless of whether or not the brake pedal is operated, after elapse of a predetermined time after it is determined that the vehicle has stopped, based on the wheel speed, and set the predetermined time longer when a friction of a surface of a road on which the vehicle travels is low than when the friction of the surface of the road is high.

* * * * *